W. THOMPSON.
ANIMAL TRAP.
APPLICATION FILED JAN. 30, 1917.

1,249,248.

Patented Dec. 4, 1917.
2 SHEETS—SHEET 1.

Witnesses
Thos. F. Knox
Edwin L. Jones

Inventor
William Thompson
By Victor J. Evans
Attorney

W. THOMPSON.
ANIMAL TRAP.
APPLICATION FILED JAN. 30, 1917.
1,249,248.
Patented Dec. 4, 1917.
2 SHEETS—SHEET 2.
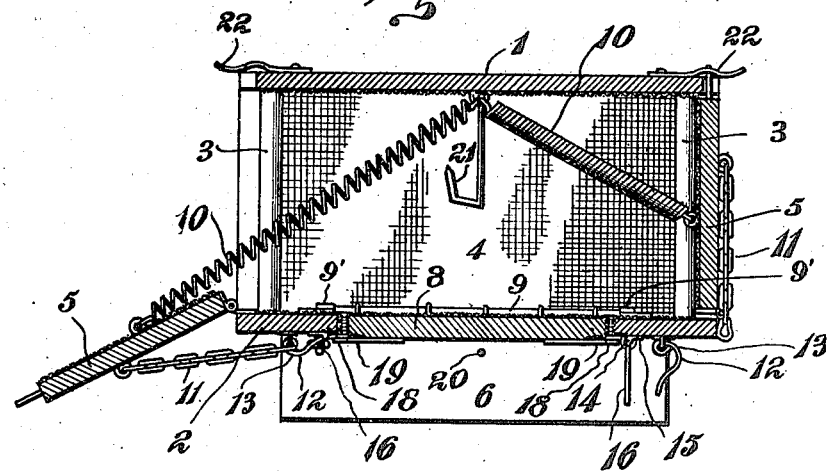
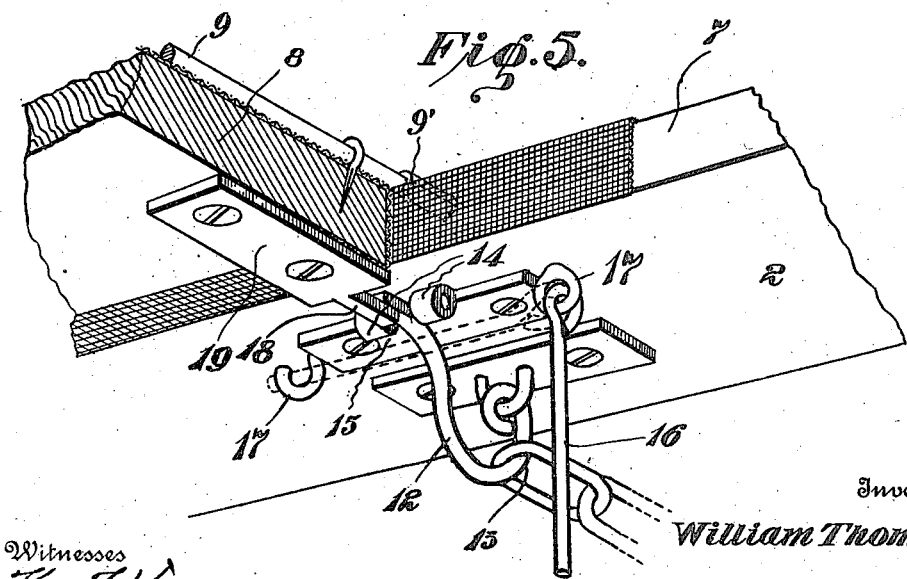
Inventor
William Thompson
By Victor J. Evans
Attorney
Witnesses

UNITED STATES PATENT OFFICE.

WILLIAM THOMPSON, OF SALT LAKE CITY, UTAH.

ANIMAL-TRAP.

1,249,248.     Specification of Letters Patent.     Patented Dec. 4, 1917.

Application filed January 30, 1917. Serial No. 145,453.

*To all whom it may concern:*

Be it known that I, WILLIAM THOMPSON, a subject of England, residing at Salt Lake City, in the county of Salt Lake and State of Utah, have invented new and useful Improvements in Animal-Traps, of which the following is a specification.

This invention relates to improvements in animal traps and has particular application to a cage trap.

The chief characteristic of this invention resides in the provision of a device of this character having a plurality of entrance openings and a common animal operating means for automatically closing the openings to trap the animal.

Another characteristic of this invention is to provide a device of the above described character having spring actuated panels for closing the entrance openings, the panels being released by a rocking platform, and means for temporarily holding the panels in open position to permit the accurate and safe setting of the platform.

Another object of this invention is to provide a device of this character which contains the desirable features of simplicity, durability and efficiency and furthermore a device which may be manufactured at a nominal cost.

Other objects of the invention will appear as the specification is read in connection with the accompanying drawings, in which:—

Fig. 4 is a longitudinal section taken on the line 4—4 of Fig. 3.

Fig. 5 is a detail perspective of the latching means showing the platform partly in section.

Figure 1:
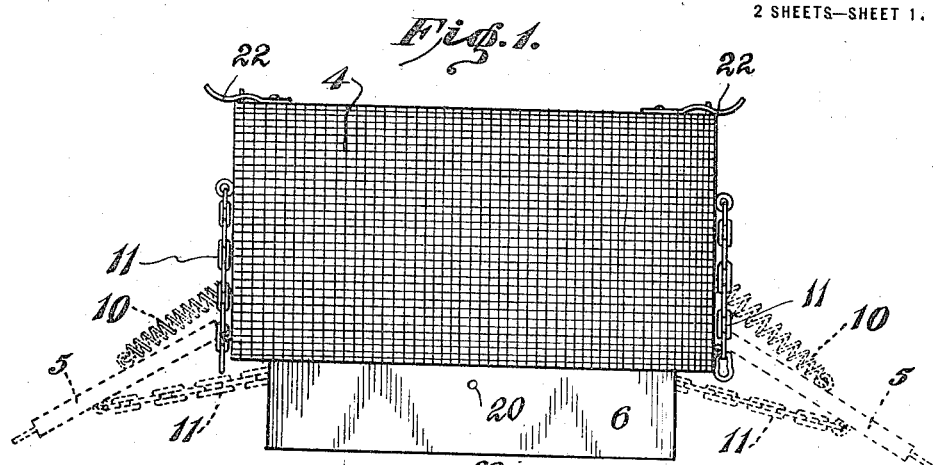
Figure 1 is a front elevation of the trap showing the elements in trap position and the elements being shown in set position in dotted lines.
Figure 2:
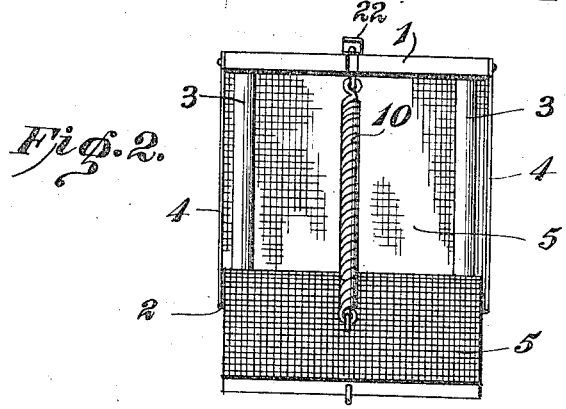
Fig. 2 is an end elevation of the trap showing one of the end panels in open position.
Figure 3:
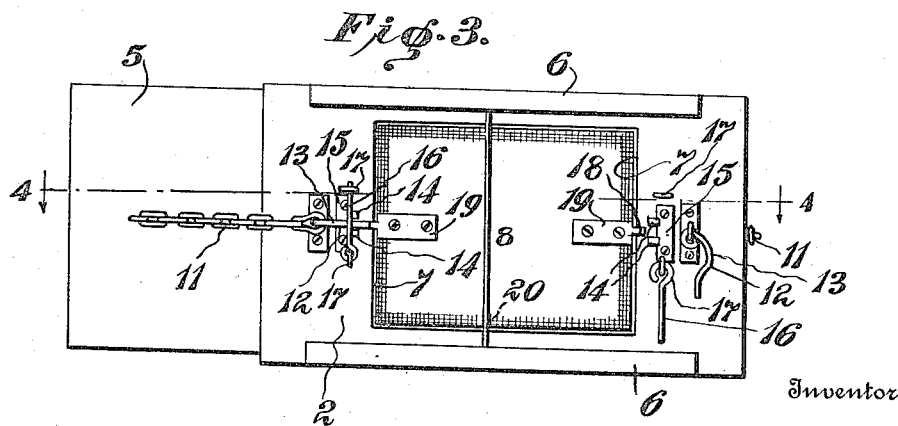
Fig. 3 is a bottom plan view of the trap showing the holding mechanism and end panels in set position.

Referring to the drawings in detail, my invention comprises a cage including top and bottom members 1 and 2 respectively which are connected at their corners by means of the rods 3, while the longitudinal edges of the top and bottom members are connected by the side members 4 which are in this instance formed of foraminous material. Hingedly secured to the opposite ends of the bottom member 2 are the swinging panels 5 which when in vertical position are adapted to close the opposite ends of the cage as is clearly shown in Fig. 1 of the drawings. The bottom member 2 is provided upon its under side adjacent its longitudinal edges with upstanding strips 6 upon which the cage is supported, the strips further serving to retain the bottom member in spaced relation to a support to permit the free operation of the trapping mechanism as will be hereinafter described. The bottom member 2 is provided at its medial portion with a rectangular opening 7 in which is mounted the actuating platform 8, the latter being of a similar contour as that of the opening but slightly smaller to permit free movement of the platform within the opening. The platform is mounted for rocking movement within the opening by means of a shaft 9 which has its opposite extremities extending beyond the platform and pivotally mounted within bearings 9' secured to the walls of the opening.

As previously stated the panels 5 are hingedly connected to the bottom member 2 and are mounted for downward swinging movement and when in set position are adapted to form an inclined platform as shown in dotted lines in Fig. 1 upon which the animals may enter the cage. The panels 5 are each provided with coiled contractile springs 10 which have one of their ends secured to the inner wall of the panel, the opposite ends being secured to the under side of the top member 1 of the cage and preferably at the medial portion thereof. The springs 10 serve to normally move the panels to closed position, the rods 3 limiting the inward movement of the panels and causing the panels to snugly engage the edges of the top and side members of the cage. Arranged upon the outer side of each of the panels 5 are short sections of chains 11, the free ends of which are adapted to be passed over the free ends of the levers 12, the latter being secured to the underside of the bottom member 2 and at opposite ends of the opening 7. The levers 12 are curved longitudinally for a portion of their length as at 13 while the free end is disposed at an angle to the remaining portion of the lever so as to lie flush with the bottom of the cage when in active position. It is to be understood that when the panels 5 are in open tion with relation to the cage, the chains when mounted upon the levers 12, the latter will hold the panels in open position against the tension of the springs 10. The levers 12 are normally mounted for swinging movement but when in set position are adapted to have their free ends disposed between spaced projections 14 which are formed on the plates 15, the latter being secured to the under side of the bottom member 2 at opposite ends of the opening 7. The levers are held against movement by means of a pivoted latch member 16, the members being adapted to span the space between the projections 14 and having their free ends mounted within the keepers 17, the keepers locking the latch members against movement and thereby confining the free ends of the levers between the projections as will be understood. The latch members 16 are only a temporary locking means for holding the levers against movement and consequent movement of the panels while the platform 8 is being moved to active position as will be described. The under side of the platform 8 is provided at its opposite ends with laterally extending lugs 18 formed on the plates 19, the lugs being of such a length as to underlie and overlap the free ends of the levers 12 when the latter are mounted between the projections 14. As the platform 8 is mounted for transverse rocking movement, when in a perfect horizontal position, the lugs 18 will engage the free ends of the levers 12 and thus hold the levers against movement and the latch members may then be removed whereupon the lugs will be the only means for holding the levers and consequently the panels against movement. When the platform is rocked to either side, out of a perfect horizontal position, the lugs will be moved to one side of the levers thus releasing the levers and permitting them to move to open position to release the panels whereupon the panels will move to closed position under the tension of the springs 10.

To limit the rocking movement of the platform 8, I have connected the strips 6 with the rod 20 which is disposed in close proximity to the platform and is adapted to be engaged by the platform when the latter is rocked upon its pivot thus limiting the rocking movement of the platform as will be understood.

In this instance I have shown the interior of the cage covered with a foraminous material for the purpose of preventing the animal in the trap from gnawing the wood portions of the trap in attempting to escape, while disposed within the cage and depending from the top wall thereof is the bait hook 21 which is disposed directly above the platform 8 as is clearly shown in Fig. 1 of the drawings.

In operation, the trap is set by swinging the panels 5 downwardly so as to assume an inclined position as shown in dotted lines in Fig. 1 of the drawings, the free ends of the chains being passed over the free ends of the levers 12 whereupon the free ends of the levers are placed between the projections 14 and the latch members moved to locking position. The platform is now moved to assume a perfect horizontal position whereby the lugs 18 will be caused to engage the free ends of the levers thus locking the levers against movement and permitting the removal of the latch member 16. When the animal enters the cage by means of the panels 5 and walks upon the platform 8 in attempting to obtain the bait upon the bait hook 21, the weight of the animal will cause the platform to rock upon its pivot thereby moving the lugs so as to disengage the levers and permit the latter to swing upon their pivots thus releasing the chains 11 whereby the panels will move to closed position under the tension of the springs 10. As the panels move simultaneously, the animal will be trapped within the cage, I having provided suitable latch means 22 arranged upon the top of the cage and engaging the panels to hold the same in closed position. It will be evident from the foregoing that I have provided simple and efficient means for positively trapping an animal and furthermore that I have provided means for safely setting the trap without the liability of subjecting the operator to injury.

It is thought from the foregoing taken in connection with the accompanying drawings that the construction and operation of my device will be apparent to those skilled in the art, and that minor changes in size, shape, proportion and minor details of construction may be made without departing from the spirit and scope of the appended claims.

What I claim is:

1. A trap comprising a cage having open ends, spring actuated panels hingedly mounted on the cage and adapted to close the ends thereof, levers pivoted to the under side of said cage, a platform rockingly mounted within the cage, lugs formed on the platform and engageable with the free ends of the levers for holding the same against movement, and chains secured to each of the panels and engageable with the levers for holding the panels in open position.

2. A trap comprising a cage having open ends and an opening formed in the bottom wall thereof, spring actuated panels swingingly mounted upon the cage and adapted to close the open ends thereof, a rocking platform mounted within said opening, levers pivotally secured to the underside of the cage, lugs formed in the platform and engageable with the levers for locking the latter against movement, chains connected to each of the panels and engageable with the levers for holding the panels in open position, and means engageable with the levers for temporarily locking the levers against movement when moving said lugs into engagement with the levers.

3. A trap comprising a cage having open ends, panels hingedly mounted on the cage and adapted to close the ends thereof, springs engageable with the panels for normally closing the same, means for holding the panels in open position, a rocking platform engageable with said holding means for releasing the latter, and means interposed between the holding means and the platform for holding the panels in open position while moving the platform to set position.

In testimony whereof I affix my signature.

WILLIAM THOMPSON.

Copies of this patent may be obtained for five cents each, by addressing the "Commissioner of Patents, Washington, D. C."